(12) United States Patent
Yeh

(10) Patent No.: US 6,984,062 B2
(45) Date of Patent: Jan. 10, 2006

(54) CAR LIGHT

(75) Inventor: Keng-Chin Yeh, Taipei (TW)

(73) Assignee: Grang Fair Industrial Co., Ltd., Taipei (TW)

( * ) Notice: Subject to any disclaimer, the term of this patent is extended or adjusted under 35 U.S.C. 154(b) by 67 days.

(21) Appl. No.: 10/842,533

(22) Filed: May 11, 2004

(65) Prior Publication Data

US 2005/0254253 A1    Nov. 17, 2005

(51) Int. Cl.
*F21V 29/00* (2006.01)
(52) U.S. Cl. .................. 362/544; 362/543; 362/545
(58) Field of Classification Search ........ 362/543–545, 362/507, 240, 249, 548
See application file for complete search history.

(56) References Cited

U.S. PATENT DOCUMENTS 6,471,368 B1 * 10/2002 Lin ........................... 362/216
6,619,829 B1 * 9/2003 Chen ......................... 362/544
6,641,295 B1 * 11/2003 Hu ............................ 362/545

* cited by examiner

*Primary Examiner*—Sandra O'Shea
*Assistant Examiner*—Robert May
(74) *Attorney, Agent, or Firm*—Rosenberg, Klein & Lee

(57) ABSTRACT

A car light is equipped with a supplementary light for helping alert people to the car, which supplementary light includes several light sources, plane lenses, and a circular lighting body; the light sources are secured on a rear cover of the car light; the plane lenses are disposed over the light sources; the circular lighting body is fitted on a circular trench formed around the car light, and has spaced condensing bumps on an outer side thereof; the plane lenses face respective ones of light passages formed on the trench; when the light sources are powered, light will be first made to travel through the light passages, and onto the circular lighting body by means of the plane lenses, and the circular lighting body will refract the light so as to shine with a complete circle-shaped light thereon.

4 Claims, 8 Drawing Sheets

CAR LIGHT

BACKGROUND OF THE INVENTION

1. Field of the Invention

The present invention relates to a circular supplementary light of a car light for helping alert people to the car, more particularly one, which can shine with complete circle-shaped light thereon and brightly, and which is easy to maintain.

2. Brief Description of the Prior Art

A car can be more easily seen if supplementary lighting elements are fitted near to or around the ordinary lights to help alert people to the car. Referring to FIGS. 8 and 9, an ordinary light 44 of a car is provided with a supplementary lighting element, which includes a support member 41, and a circular lighting body 42. The support member 41 has a circular trench 411, a through hole 412 on the trench 411, and several fitting portions 413 projecting in an opposite direction of the circular trench 411. The support member 41 is secured around the ordinary light 44 with the fitting portions 413 engaging an outer side of the ordinary light 44. The circular lighting body 42 includes a housing, which is made by means of injection molding, two light emitting diodes 43, which are, before the injection molding process of the housing, disposed in the mold so as to be securely hidden in the housing, and directed to opposite directions. A cord 431 is connected to the light emitting diodes 43. The circular lighting body 42 is securely fitted in the circular trench 411 of the support member 41 with the cord 431 being passed through the through hole 412.

Thus, when the light emitting diodes 43 are powered, the circular lighting body 42 will shine, thus helping alert people to the car.

However, the supplementary lighting element is found to have the following disadvantages:

1. Because the light emitting diodes 43 are buried in the housing right in the injection molding process of the housing, they can't be separated from the housing, and the whole circular lighting body 42 has to be replaced with a new one when any of the light emitting diodes 43 is faulty. In other words, the supplementary lighting element isn't economical to use.
2. The light emitting diodes 43 are buried in the housing, and can only emit light from outward sides thereof, incapable of shining themselves. Consequently, the circular lighting body 42 will shine with a broken circle-shaped light thereon instead of a complete circle-shaped one.
3. Because the light emitting diodes 43 are buried in the housing, directed to opposite directions, and can only emit light from outward sides thereof, the area between opposing ends thereof can't shine either, and the circular lighting body 42 can't shine with a complete circle-shaped light.
4. The light emitting diodes 43 are visible therefore they will spoil the look of the whole car light.

SUMMARY

It is a main object of the present invention to provide a supplementary lighting element of an ordinary car light to overcome the above disadvantages.

The supplementary lighting element includes several light sources, plane lenses, and a circular lighting body. The light sources are secured on a rear cover of the ordinary car light, and the plane lenses are positioned over respective ones of the light sources. The circular lighting body is fitted on a circular trench formed around the car light, and has spaced condensing bumps on an outer side thereof. The plane lenses face respective ones of light passages on the trench. Thus, when the light sources are powered, light will be first made to travel through the passages on the circular trench, and onto the circular lighting body by means of the plane lenses, and the circular lighting body will refract the light so as to shine with a complete circle-shaped light thereon.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
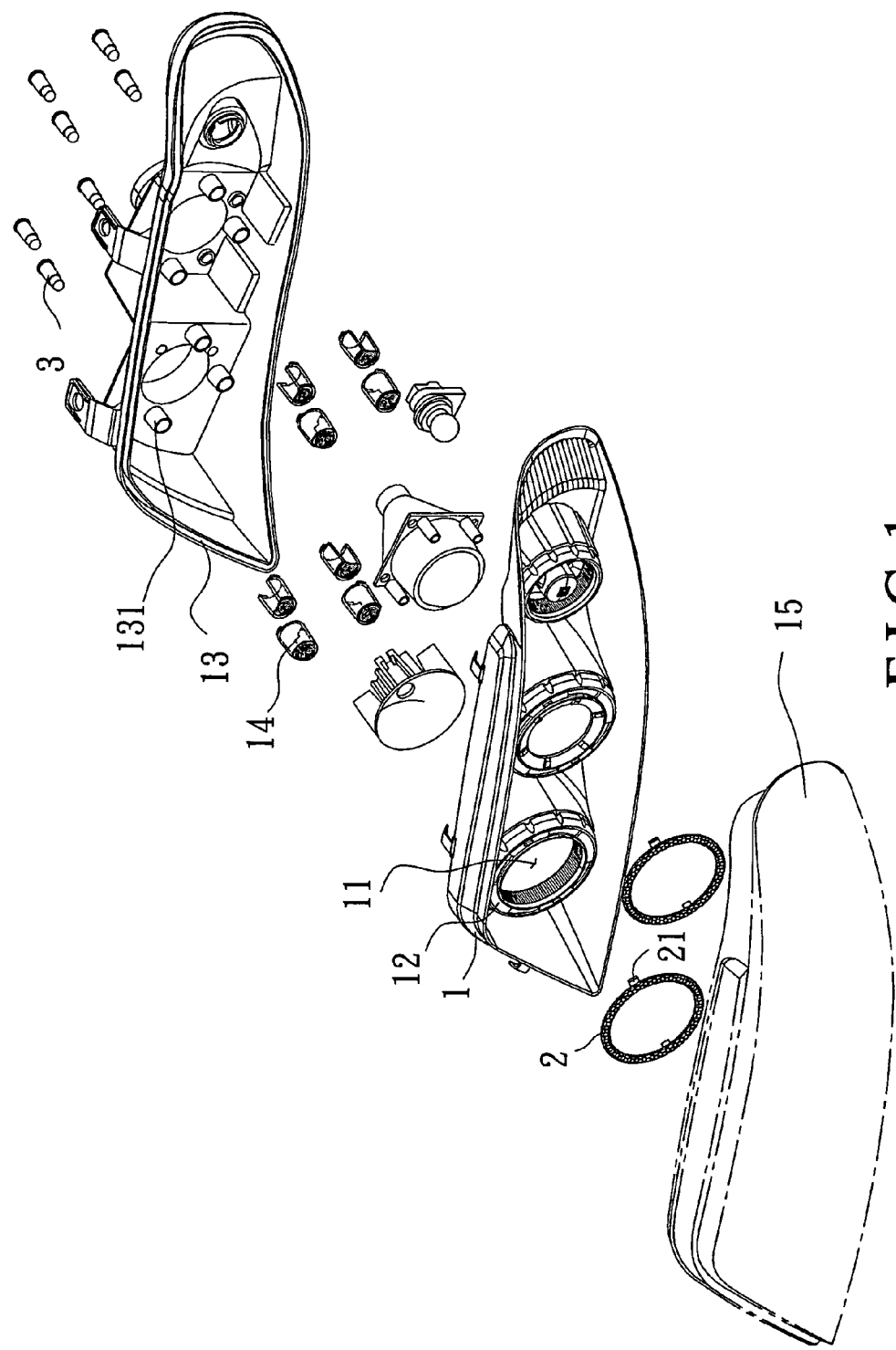
FIG. 1 is an exploded perspective view of the car light according to the present invention.
Figure 2:
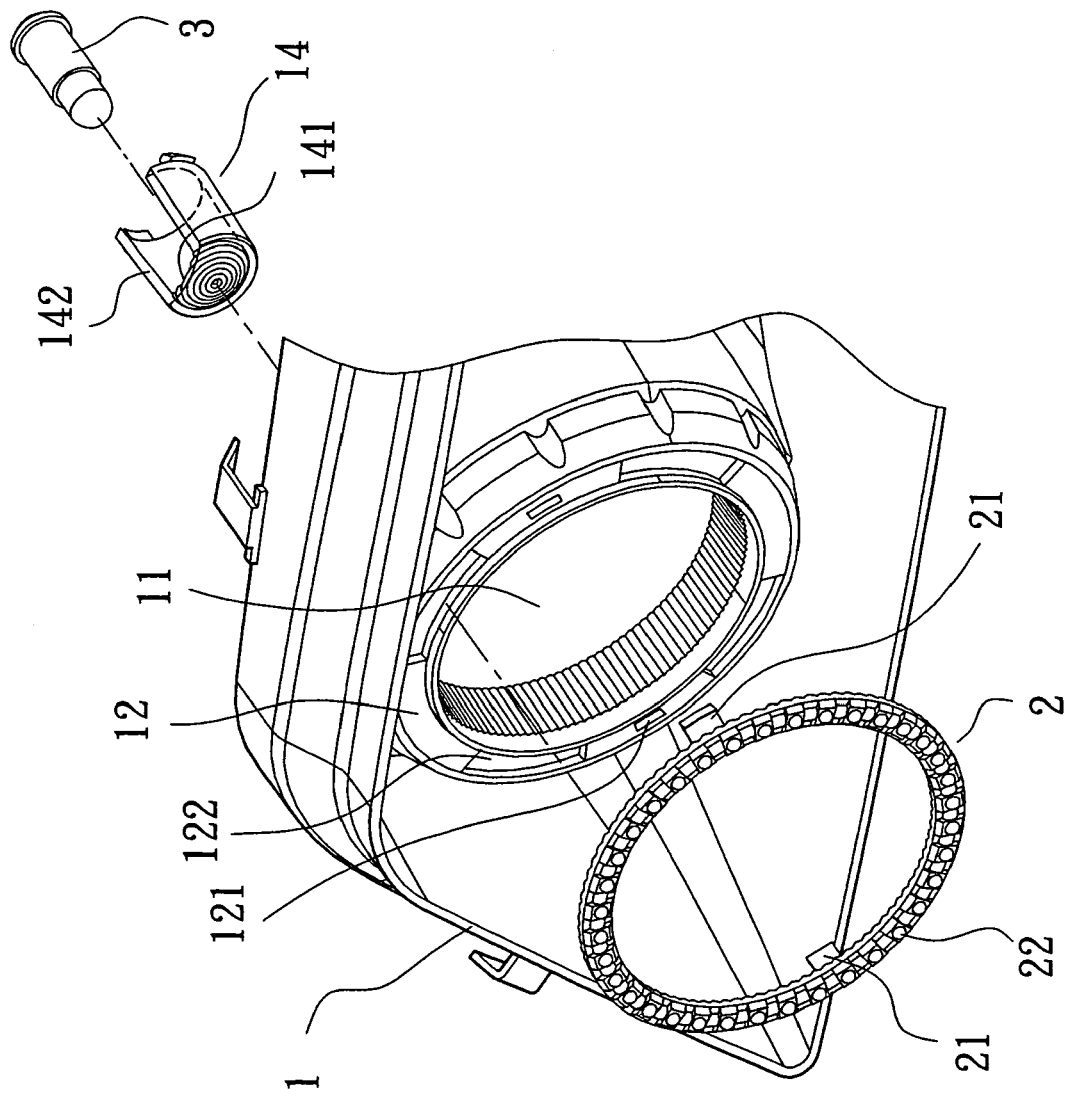
FIG. 2 is a partial exploded perspective view of the car light according to the present invention.

Referring to FIGS. 1 and 2, a preferred embodiment of a car light includes a holding member 1, a rear cover 13, a front cover 15, and a supplementary lighting element for helping alert people to the car, which has several plane lenses 14, several circular lighting bodies 2, and several light sources 3.

The holding member 1 is formed with several holding holes 11 for holding conventional lamps (not numbered) therein, and circular holding trenches 12 around respective ones of front ends of the lamp holding holes 11. Furthermore, the holding member 1 has several connecting holes 121 on the holding trenches 12, and several light passages 122, which are formed on the holding trenches 12, and face front.

The rear cover 13 is formed with several fitting holes 131 on a front side thereof, which will face respective ones of the light passages 122 when the rear cover 13 is joined to the holding member 1, and which are provided for holding the light sources 3 therein such that light can travel outside from the light sources 3; the light sources 3 can be light emitting diodes or bulbs. Each of the plane lenses 14 is formed with a transparent face portion 141, which has a corrugated rear side, and a vent hole 142 on a lateral portion thereof.

Each of the circular lighting bodies 2 has several equidistantly spaced condensing bumps 22 over a front side thereof, and several spaced fitting portions 121, which project rearwards, and are shaped in such a way as to be capable of engaging the holding member 1 after they are passed into the connecting holes 121. In addition, referring to FIGS. 3 and 4, there are various designs of circular lighting bodies 2, and there will be circular lights with different visual effects shining on circular lighting bodies 2 of different designs.

Figure 4:
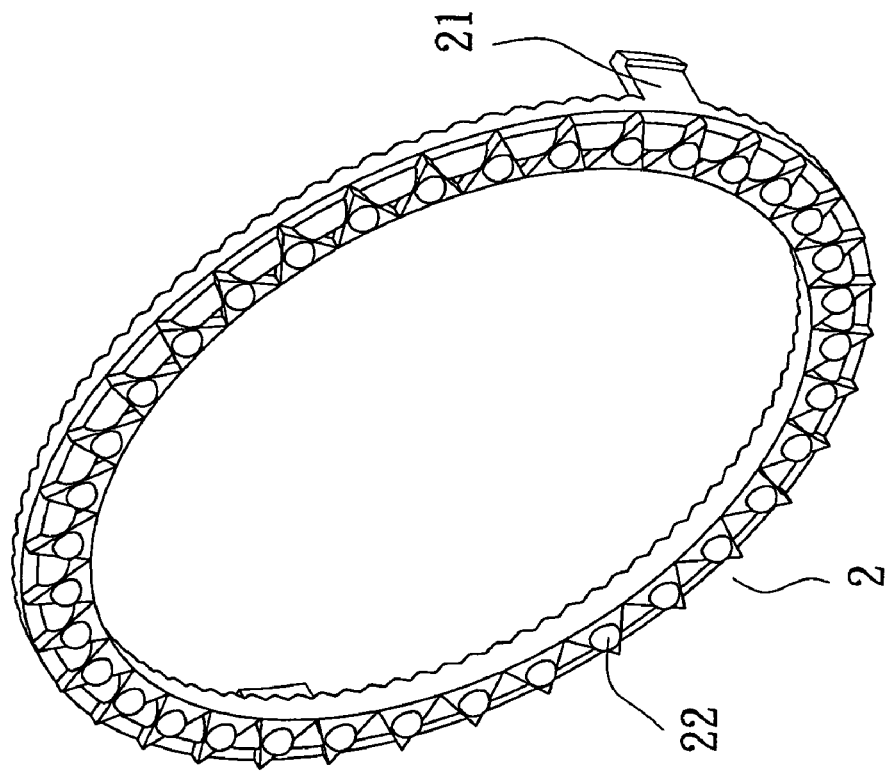
FIG. 4 is a third embodiment of the circular lighting body.
Figure 3:
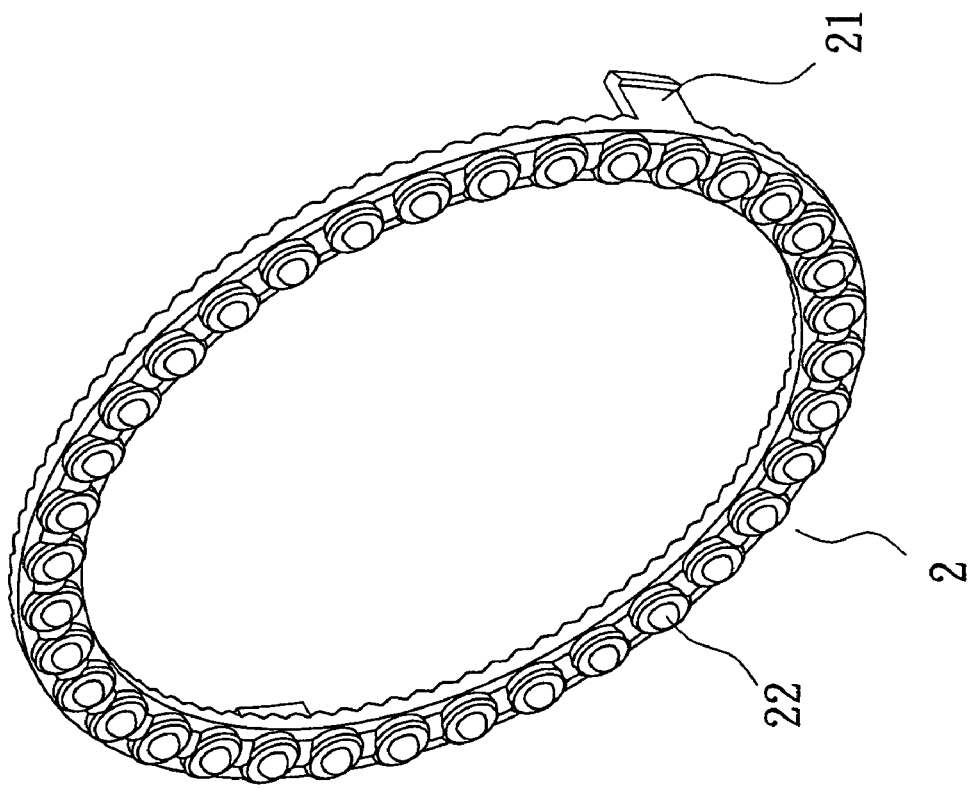
FIG. 3 is another embodiment of the circular lighting body in the present invention.
Figure 5:
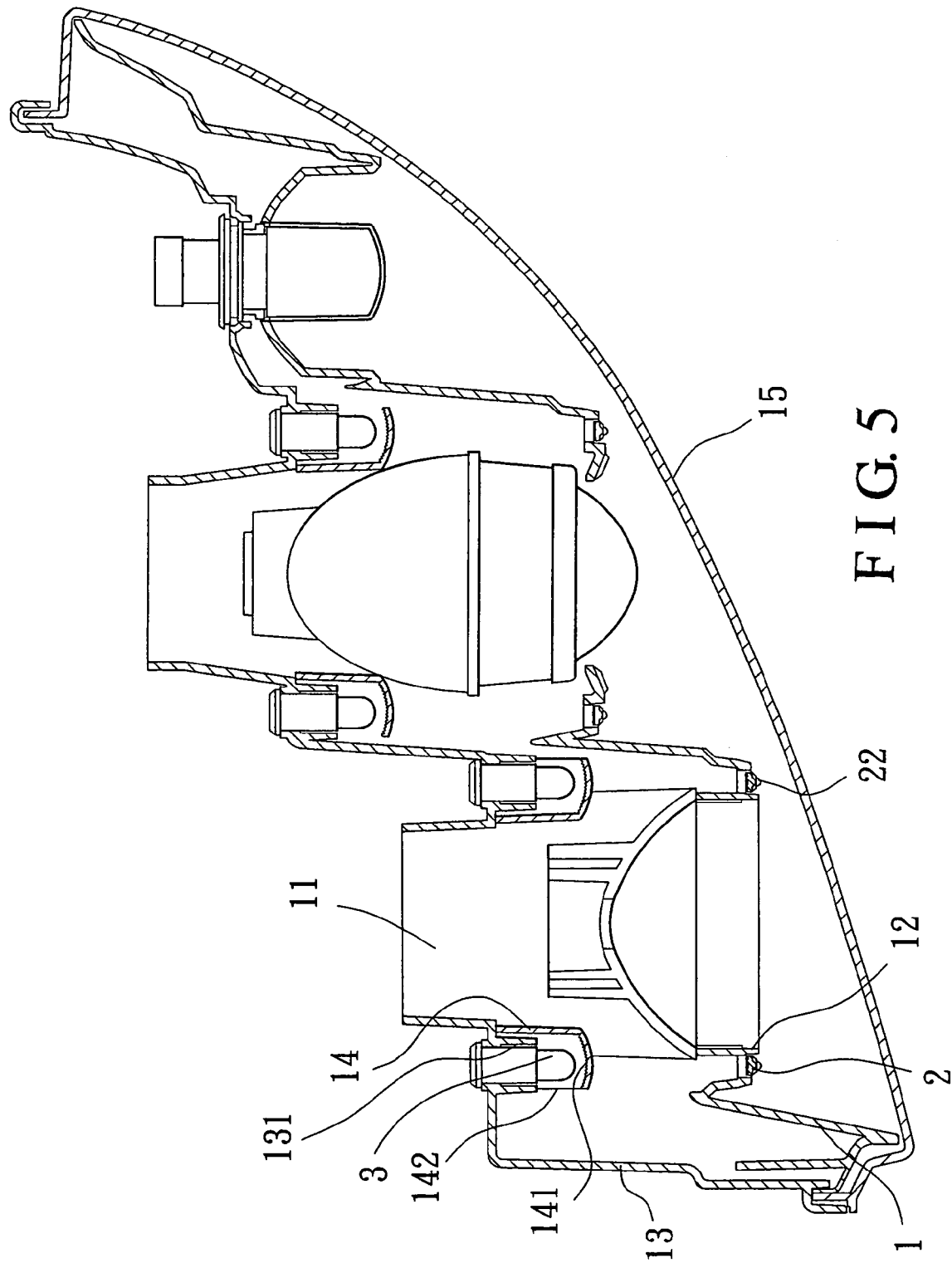
FIG. 5 is a vertical section of the car light of the present invention.
Figure 6:
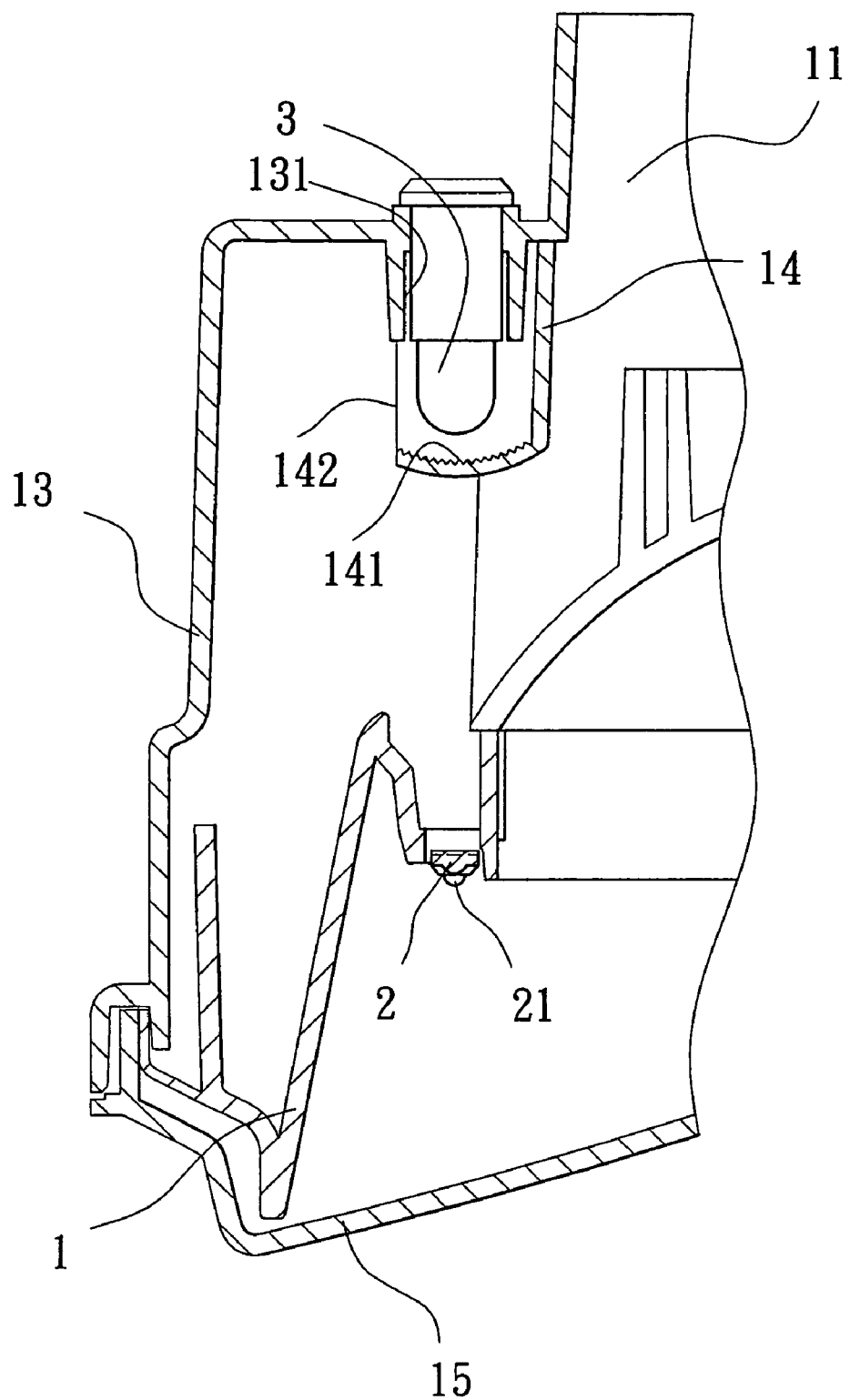
FIG. 6 is a partial vertical section of the car light of the present invention.
Figure 7:
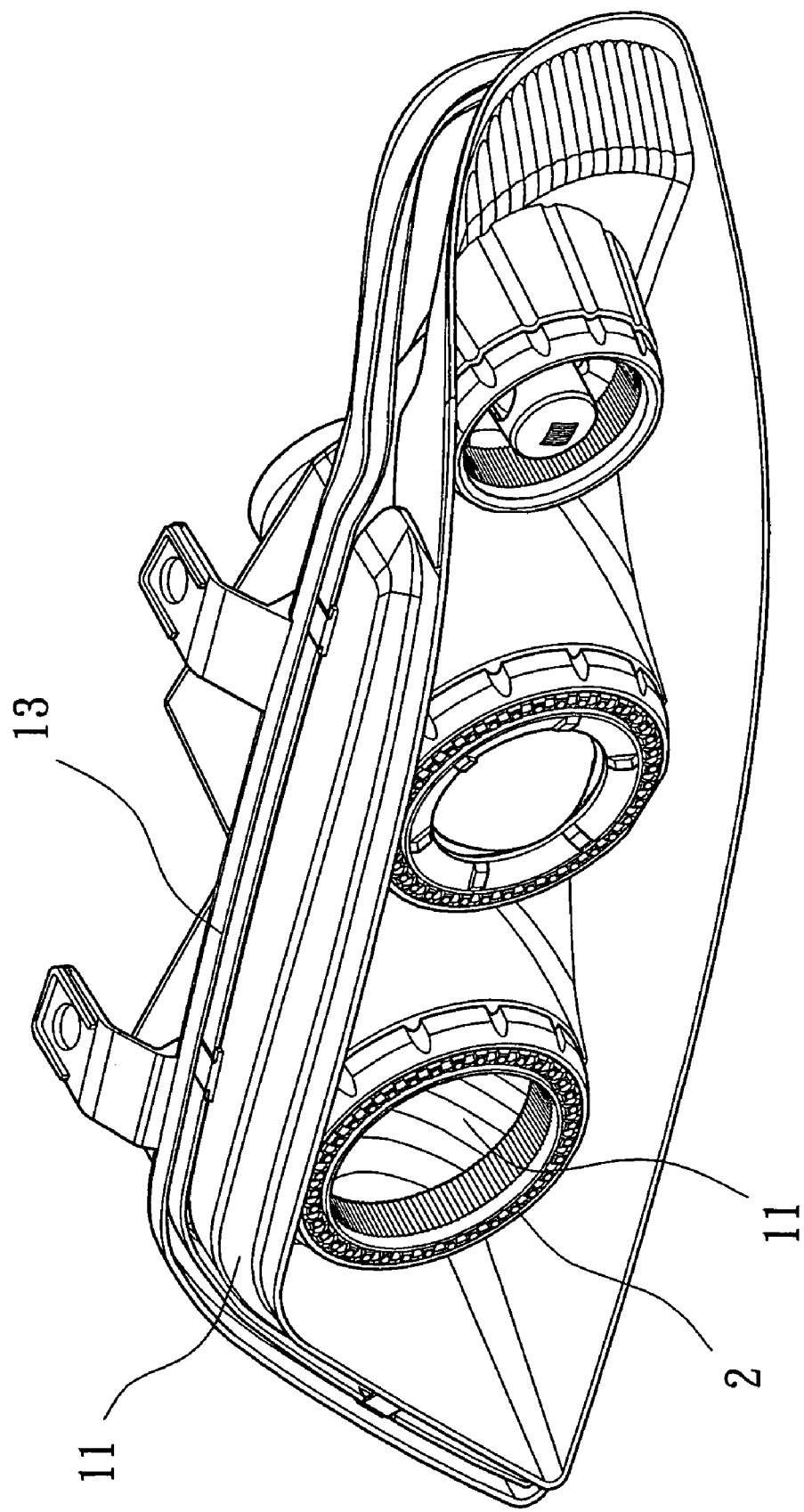
FIG. 7 is a perspective view of the present car light.
Figure 8:
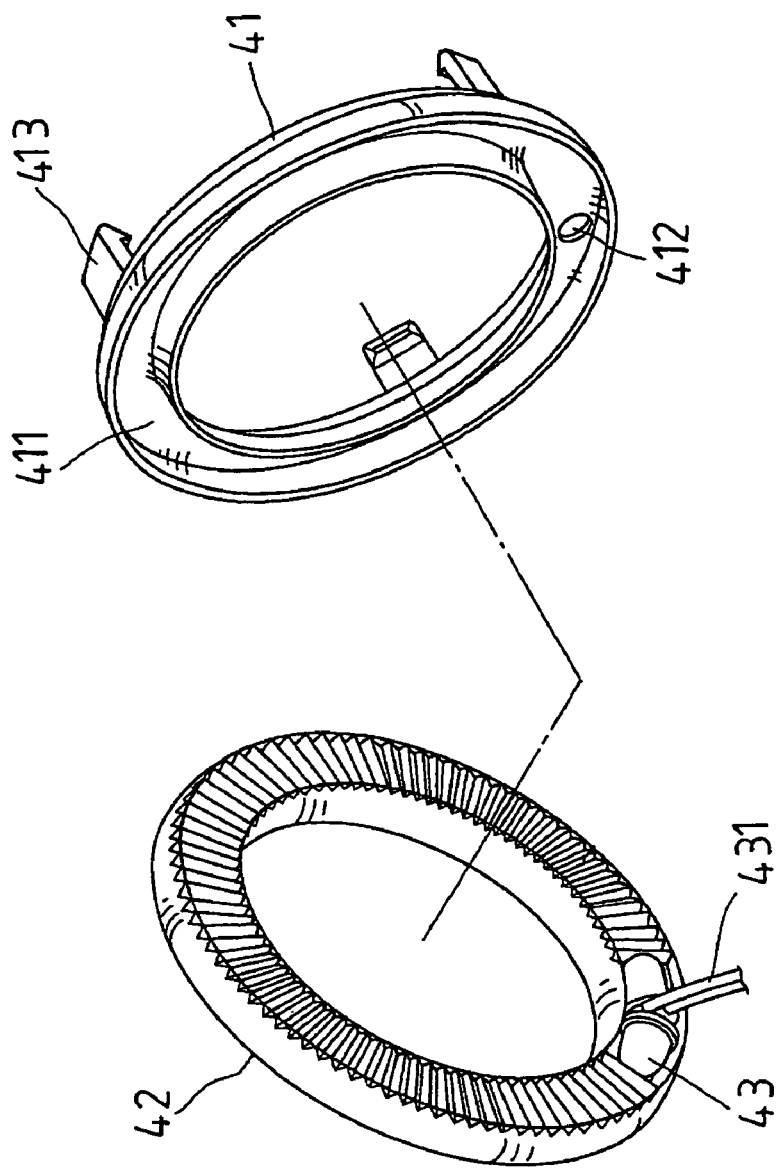
FIG. 8 is an exploded perspective view of the conventional car light described in Background.
Figure 9:
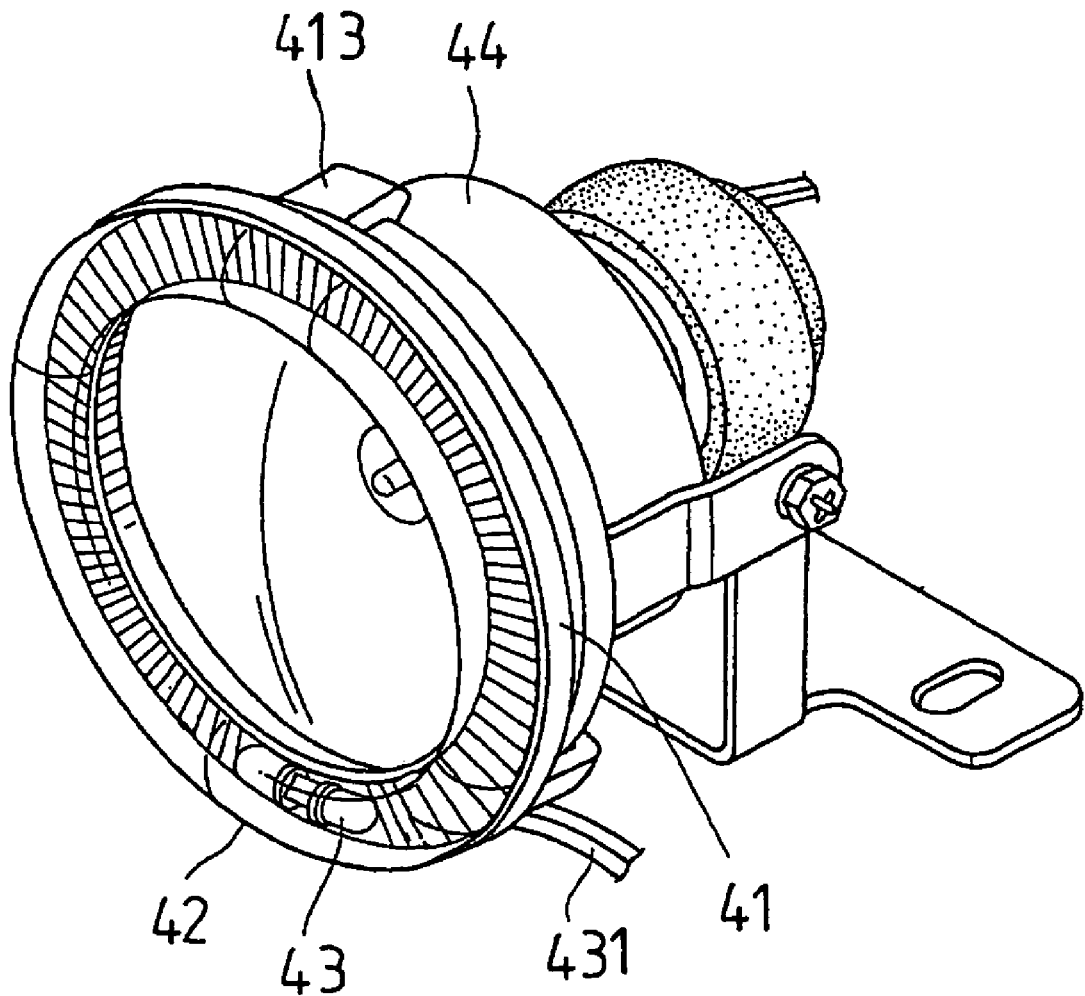
FIG. 9 is a perspective view of the conventional car light.

In assembling the present car light, referring to FIGS. 3 to 5, first the circular lighting bodies 2 are securely fitted on respective ones of the circular holding trenches 12 of the holding member 1 with the fitting portions 21 being passed into the connecting holes 121, and engaging the holding member 1. Next, the light sources 3 are securely fitted in respective ones of the fitting holes 131 of the rear cover 13, and the plane lenses 14 are securely fitted over the fitting holes 131 as well as the light sources 3. And finally, the rear and the front covers 13, and 15 are securely joined to the holding member 1.

Thus, when the light sources 3 are powered, light will be first made to travel through the light passages 122 of the holding member 1, and onto the circular lighting bodies 2 by means of the transparent face portions 141 of the plane lenses 14, which circular lighting bodies 2 will refract the light such that each of them shine with a complete circle-shaped light thereon. And finally, the condensing bumps 22 will make the complete circular lights brighter such that the complete circular lights can help alert people to the car effectively. In addition, heat produced by the power sources 3 will escape more easily owing to the vent holes 142 of the plane lenses 14.

From the above description, it can be easily understood that the car light of the present invention has advantages as followings:

1. The light sources 3 are detachably fitted in the fitting holes 131 of the rear cover 13 therefore when if any of the light sources 3 is faulty, it can be replaced individually, and the rear cover 13 doesn't have to be replaced together with the light sources 3. Consequently, the car light is easier, and costs less to maintain as compared with the prior art.
2. The circular lighting bodies 2 will shine with complete circular lights instead of broken circle-shaped lights of the prior art because of the plane lenses 14, and the circular lighting bodies 2, which are used for guiding, and refracting light respectively.
3. The light sources 3 are arranged on the rear cover 13, and hidden behind the holding member 1, and the front cover 15 therefore they can show to spoil the look of the whole car light.
4. The circular lighting bodies 2 are directly fitted around the lamp holding holes 11 of the holding member 1 therefore their use won't be limited to certain types of cars, and are more flexible.
5. The circular lighting bodies 2 are formed of different designs, on which circular lights with different visual effects will shine, therefore the circular lighting bodies 2 can alert people to the car effectively.
6. The present invention can be used on front lights as well as rear lights of a car such that safety of driving is increased.

What is claimed is:

1. A car light comprising car light, comprising
   a holding member formed with a plurality of holding holes for holding lamps therein; the holding member having circular holding trenches around respective ones of front ends of the lamp holding holes; the holding member having a plurality of connecting holes on the circular holding trenches; the holding member having a plurality of spaced light passages formed on the circular holding trenches and facing front;
   a rear cover secured on a rear side of the holding member; the rear cover having a plurality of fitting holes on a front side thereof, which face respective ones of the light passages of the holding member; and
   a supplementary lighting member including:
   (1) a plurality of light sources detachably held in respective ones of the fitting holes of the rear cover;
   (2) a plurality of plane lenses disposed over the light sources as well as the fitting holes of the rear cover; each of the plane lenses including a transparent face portion facing a corresponding light passage; and
   (3) a plurality of circular lighting bodies held on respective ones of the circular holding trenches of the holding member; each of the circular lighting bodies having a plurality of fitting portions projecting rearwards; the fitting portions being passed into respective ones of the connecting holes of the holding member, and engaged with the holding member to secure the circular lighting bodies to the holding member;
   whereby each of the circular lighting bodies will shine with a complete circle-shaped light thereon when the light sources are powered.

2. The car light as claimed in claim 1, wherein each of the circular lighting bodies has a plurality of equidistantly spaced condensing bumps formed over a front side thereof for condensing light that travels through it.

3. The car light as claimed in claim 1, wherein the transparent face portions of the plane lenses have corrugated rear sides facing respective ones of the light sources.

4. The car light as claimed in claim 1, wherein each of the plane lenses has a vent hole thereon for allowing heat to escape through it.

* * * * *